United States Patent
Idicula et al.

(10) Patent No.: US 10,108,666 B2
(45) Date of Patent: Oct. 23, 2018

(54) ADAPTIVE HANDLING OF SKEW FOR DISTRIBUTED JOINS IN A CLUSTER

(71) Applicant: Oracle International Corporation, Redwood Shores, CA (US)

(72) Inventors: Sam Idicula, Santa Clara, CA (US); Wolf Roediger, Munich (DE)

(73) Assignee: Oracle International Corporation, Redwood Shores, CA (US)

( * ) Notice: Subject to any disclaimer, the term of this patent is extended or adjusted under 35 U.S.C. 154(b) by 352 days.

(21) Appl. No.: 14/871,490

(22) Filed: Sep. 30, 2015

(65) Prior Publication Data

US 2016/0267135 A1 Sep. 15, 2016

Related U.S. Application Data

(60) Provisional application No. 62/131,018, filed on Mar. 10, 2015.

(51) Int. Cl.
*G06F 17/30* (2006.01)
(52) U.S. Cl.
CPC .. *G06F 17/30466* (2013.01); *G06F 17/30339* (2013.01); *G06F 17/30598* (2013.01)
(58) Field of Classification Search
CPC ......... G06F 17/30466; G06F 17/30339; G06F 17/30598
USPC ...................................................... 707/714
See application file for complete search history.

(56) References Cited

U.S. PATENT DOCUMENTS

| | | | |
|---|---|---|---|
| 6,665,654 | B2 * | 12/2003 | Broden et al. |
| 2002/0194157 | A1 * | 12/2002 | Zait et al. ................. 707/2 |
| 2014/0067791 | A1 * | 3/2014 | Idicula et al. ............ 707/714 |
| 2016/0026667 | A1 * | 1/2016 | Mukherjee et al. ........ 707/2 |
| 2018/0089261 | A1 * | 3/2018 | Li ................... G06F 17/30442 |

OTHER PUBLICATIONS

Philip A. Bernstein et al., semi-join, relational database, relational query processing, Jan. 1981, ACM, vol. 28, 25-40.*

(Continued)

*Primary Examiner* — Jean B Fleurantin
(74) *Attorney, Agent, or Firm* — Hickman Palermo Becker Bingham LLP; Khachatur V. Papanyan

(57) ABSTRACT

Techniques for detecting data skew while performing a distributed join operation on tables in a cluster of nodes managed by database management system (cDBMS), is disclosed. In an embodiment, heavy hitter values in a join column of a table are determined during the runtime of a distributed join operation of the table with another table. The cDBMS keeps in a datastore a count for each unique value read from the join column of the table. The datastore may be a hash table with the unique values serving as keys and may additionally include a heap or a sorted array for an efficient count based traversal. When a count for a particular value in the datastore exceeds a threshold, then the particular value is identified as a heavy hitter value. The tuples from the joined table that include the heavy hitter value, are kept local at the node that the tuples were originally distributed to, while the other joined table tuples are broadcasted to one or more nodes of the cDBMS that at least include the originally distributed nodes.

24 Claims, 5 Drawing Sheets

(56) References Cited

OTHER PUBLICATIONS

Polychroniou et al., "Track Join: Distributed Joins with Minimal Network Traffic", SIGMOD'14, Jun. 22-27, 2014, Snowbird, UT, USA. Copyright 2014 ACM, 12 pages.
Cormode et al., "Methods for Finding Frequent Items in Data Streams", The VLDB Journal manuscript, dated 2010, 18 pages.
DeWitt et al., "Practical Skew Handling in Parallel Joins", Proceedings of the 18th VLDB Conference Vancouver, British Columbia, Canada 1992, 14 pages.
Frey et al., "Spinning Relations: High-Speed Networks for Distributed Join Processing", Proceedings of the Fifth International Workshop on Data Management on New Hardware, AMC, Jun. 28, 2009, 7 pages.
Goncalves et al., "The Data Cyclotron Query Processing Scheme", ACM Transactions on Database Systems, vol. V, No. N, Article A,, dated 2010, 32 pages.
Hua, et al., "Handling Data Skew in Multiprocessor Database Computers Using Partition Tuning", proceedings of the 17th International Conference on Very Large Data Bases, dared Sep. 1991, 11 pages.
Kitsuregawa et al., "Bucket Spreading Parallel Hash: A New, Robust, Parallel Hash Join Method for Data Skew in the Super Database Computer (SDC)", Proceedings of the 16th VLDB Conference, 1990, 12 pgs.
Leis et al., "Morsel-Driven Parallelism: A NUMA-Aware Query Evaluation Framework for the Many-Core Age", SIGMOD'14, Jun. 22-27, 2014, Snowbird, UT, USA. ACM 978-1-4503-2376-5/14/06., 12 pages.
Manegold et al., "Optimizing Main-Memory Join on Modern Hardware", IEEE Transactions on Knowledge and Data Engineering, vol. 14, No. 4, Jul./Aug. 2002, 22 pages.
Metwally et al., "Efficient Computation of Frequent and Top-k Elements in Data Streams", dated 2005, 15 pages.
Blanas et al., "Memory Footprint Matters: Efficient Equi-Join Algorithms for Main Memory Data Processing", SoCC'13, Oct. 1-3, 2013, Santa Clara, California, USA., 16 pages.
Plattner, Hasso, "The Impact of Columnar in Memory Databases on Enterprise Systems", Proceedings of the VLDB Endowment, vol. 7, No. 13, dated 2014, 8 pages.
Xu et al., "Handling Data Skew in Parallel Joins in Shared-Nothing Systems", SIGMOD'08, Jun. 9-12, 2008, Vancouver, BC, Canada. Copyright 2008 ACM, 10 pages.
Ray et al., Skew-Resistant Parallel In-memory Spatial Join, SSDBM '14, Jun. 30-Jul. 2, 2014, Aalborg, Denmark. Copyright 2014 ACM, 12 pages.
Rodiger et al., "HighSpeed Query Processing over HighSpeed Networks", Proceedings of the VLDB Endowment, vol. 9, No. 4 Copyright 2015 VLDB Endowment, 12 pages.
Rodiger et al., "Locality-Sensitive Operators for Parallel Main-Memory Database Clusters", dated 2014, 12 pages.
Roy et al., "Efficient Frequent Item Counting in Multi-Core Hardware", KDD'12, Aug. 12-16, 2012, Beijing, China. Copyright 2012 ACM, 9 pages.
Shah et al., "Flux: An Adaptive Partitioning Operator for Continuous Query Systems", Proceedings of the 19th International Conference on Data Engineering, IEEE, dated 2003, 12 pages.
Stamos et al., "A Symmetric Fragment and Replicate Algorithm for Distributed Joins", IEEE Transactions on Parallel and Distributed Systems, vol. 4, No. 12, dated Dec. 1993, 10 pages.
Teubner et al., "Frequent Item Computation on a Chip", IEEE Transactions on Knowledge and Data Engineering, vol. 23, No. 8, Aug. 2011, 13 pages.
Tian et al., "Tuple Routing Strategies for Distributed Eddies", Proceedings of the 29th VLDB Conference, Berlin, Germany, 2003, 12 pages.
Wolf et al., "A Parallel Hash Join Algorithm for Managing Data Skew", IEEE Transactions on Parallel and Distributed Systems, vol. 4, No. 12, dated Dec. 1993, 17 pages.
Muhleisen et al., "Peak Performance—Remote Memory Revisited", DaMoN'13 Jun. 24, 2013, New York, NY, USA., 7 pages.

\* cited by examiner

ADAPTIVE HANDLING OF SKEW FOR DISTRIBUTED JOINS IN A CLUSTER

BENEFIT CLAIM; CROSS-REFERENCE TO RELATED APPLICATION

This application claims the benefit of Provisional Appln. 62/131,018, filed Mar. 10, 2015, the entire contents of which is hereby incorporated by reference as if fully set forth herein, under 35 U.S.C. § 119(e).

FIELD OF THE INVENTION

The present invention relates generally to database management systems and more particularly to cluster assisted database management systems.

BACKGROUND

Query processing has been optimized for disk-based systems, because these systems can hold very large tables on which the processing operates. A common operation in query processing is a join operation on very large tables. Such a join operation may incur many I/O operations to the disk system, reducing performance. An alternative to disk-based systems is a cluster of computing nodes, each of which has a processor, a modest amount of memory, and non-persistent storage for storing table data accessed by query processing, and each of which are connected together through a network. A cluster of computing nodes, however, can have a very large number, in fact, thousands of nodes. The total memory and processing power of the large number of nodes of a cluster provides advantage over disk based systems, particularly when nodes perform operations for query processing in parallel. Such cluster of computing nodes may be used for a database management system and is referred herein as "cDBMS."

However, since the computing nodes of a cluster have relatively small memory compared to the disk storage of disk based systems, each node may not be able to store all the database objects required for a join operation in a query. Accordingly, the database objects or portions thereof have to be distributed or replicated between nodes in the cluster, perhaps creating an uneven distribution of database object data across the cluster. Such an uneven distribution overloads one or more nodes in the cluster reducing the overall performance of the join operation and diminishing the advantage of parallel processing of cluster over disk based systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings of certain embodiments in which like reference numerals refer to corresponding parts throughout the figures.

DETAILED DESCRIPTION

Figure 1:
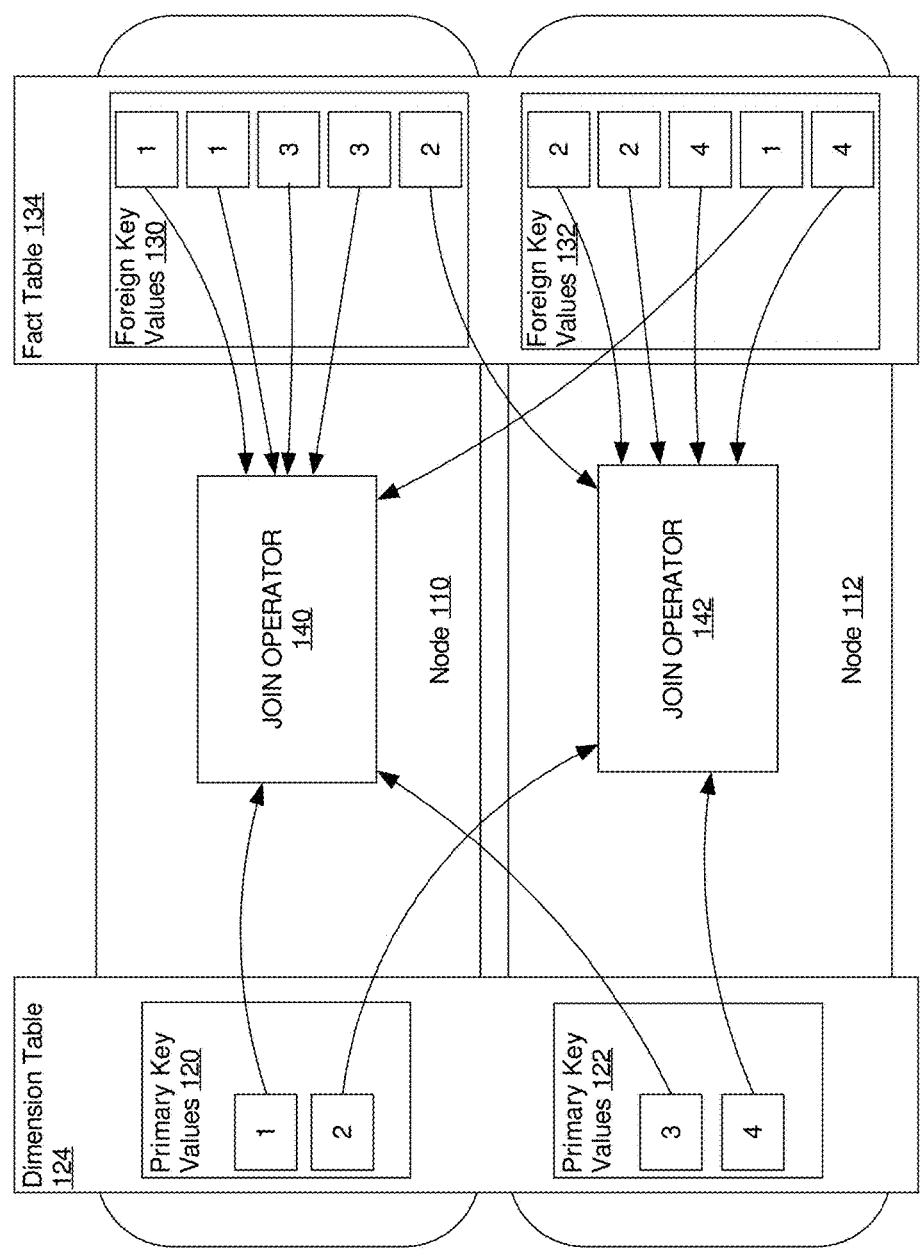
FIG. 1 is a block diagram illustrating the transfer of non-heavy hitter tuples during a distributed join execution, in an embodiment.

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

General Overview

One solution to the limited memory space in clustered nodes is to partition tables in a join operation across nodes in the cluster and perform a distributed join operation across the cluster. The term "distributed join" refers herein to an collection of local join operations on each cluster node that stores a partition from each of the tables in the join operation. After the collection of the executed local join operations from each node, the distributed join operation yields the same result as performing a join operation on the tables in a disk-based system. Although, the parallel execution of the local join operations on the nodes in the cluster improves the speed of the distributed join operation, the distributed join operation is still only as fast as its slowest node. Thus if an overload in a local join operation occurs on a single node, that single node overload may cause the whole distributed join operation across the cluster to significantly underperform.

One such cause for an overload of a local join operation on a node is data skew in the joined tables. The term "data skew" refers herein to a measure of the asymmetry in the probability distribution of data values in a data set such as column values of join key. Data skew is particularly evident when one or more of data values in the data set are much more frequent than others, such data values are referred to herein as "heavy hitters."

Heavy hitters in "join keys" are particularly problematic for a distributed join operation. The term "join keys" refers to the columns on which the distributed join operation of the tables is performed. The term "join key values" refers to the values of join keys or transformations thereof.

If a heavy hitter join key value is joined by a single particular node, then the local join operation on the particular node would have more rows (corresponding to join key values) to process than local join operations on other nodes. This imbalance may cause the other nodes to finish the local join processing earlier and wait for the particular node to process the local join operation. Such wait would delay the execution of the distributed join across the cluster.

Therefore, during a join operation, if a heavy hitter join key value is detected, then the heavy hitter join key value is not transferred to the node that contains the corresponding primary key join key value but rather is left local at the originally distributed node. Rather, the primary key join key value is broadcasted across the set of nodes that includes the originally distributed node. Doing so, a cluster based database management system (cDBMS) takes advantage of disbursement of heavy hitter join key values across the nodes during the original distribution of join key values. Accordingly, no node in the cDBMS would have a significant imbalance that would cause a node to delay the execution of the distributed join across the cluster.

In one embodiment, the heavy hitters (thus the data skew) in the joined tables may be detected prior to the distributed join operation. The data skew and heavy hitters may be determined through statistical analysis of the joining table. However, such approach depends on expensive analysis phases before the execution of the join operation and slows down the join processing, particularly for non-skewed workloads.

To speed up the processing of join operations on a cDBMS, techniques are described herein for performing distributed join operations based on join operation run-time detection of heavy hitters. In an embodiment, the cDBMS performs a distributed join operation on a table on the table's primary key column. The term "primary key column" refers herein to a column in a table that has a unique value for each row in the table. The table joined on its primary key column is referred herein as a "dimension table." The table that is joined with the dimension table is referred herein as a "fact table," and the column on which the fact table is joined is referred herein as a "foreign key column."

To execute the distributed join operation with a fact table, the cDBMS partitions the dimension table across the nodes of the cDBMS based on the primary key values. As the cDBMS processes the joined fact table for the distributed join, the fact table "tuples" are distributed across the nodes of the cDBMS that contain the primary key tuples.

As the fact table tuples are distributed, the tuples of the fact table are probed for heavy hitters, and information about detected heavy hitters is stored in a datastore. The information in the datastore is continuously updated as more tuples from the fact table are processed. When the cDBMS determines that a satisfactory number of fact table tuples have been processed for detecting heavy hitters, the cDBMS broadcasts the dimension table tuples that correspond to the fact table heavy hitter values. The term "broadcast" refers herein to the replication of a particular tuple across nodes of a cDBMS that are executing the distributed join operation.

Importantly, once a primary key heavy hitter tuple is broadcasted, any node that receives the corresponding foreign key heavy hitter tuple, can locally process the join operation involving the received heavy hitter. Accordingly, there is no need to send the received foreign key heavy hitter tuple to the original node where the corresponding primary key tuple was originally partitioned to. Rather than concentrating all tuples for a heavy hitter value on a single node, the load of heavy hitter tuples is distributed across the cDBMS for the local join operations.

Distributed Join

FIG. 1 is a block diagram illustrating the transfer of non-heavy hitter tuples during a distributed join execution, in an embodiment. Node 110 and node 112 are exemplary nodes of a cDBMS that are executing a distributed join operation on dimension table 124 and fact table 134 based on a primary key column and foreign key column, respectively. In one embodiment, primary key values, such as primary key values 120/122, and foreign key values, such as foreign key values 130/132, are the actual values from a respective column in dimension table 124 and a respective column in fact table 134. In another embodiment, the values in primary key values 120/122 and foreign key values 130/132 are transformations (using hashing algorithm) of the actual values in the respective columns of dimension table 124 and fact table 134, such that each unique actual value corresponds to a unique transformed value.

In an embodiment, the cDBMS originally distributes the tuples of dimension table 124 equally amongst nodes 110/112 based on the primary key column on which the distributed join is to be executed. Accordingly, tuples from dimension table 124 having primary key values 120, with values 1 and 2, are stored on node 110, and tuples having primary key values 122, with values 3 and 4 are stored on node 112.

The cDBMS originally distributes the fact table 134 tuples across the nodes in the same order as the tuples are read from fact table 134, in an embodiment. The fact table tuples may be read in the substantially same order that the tuples are stored. In an example, the tuples may be read based on block numbers that the tuple are persistently stored in. However, the exact methodology used to distribute tuples across the nodes of the cDBMS is not critical to the techniques described herein.

The cDBMS may later transfer dimension table 124 tuples from the originally distributed node based on the processing of fact table 134 to accumulate same valued primary key and foreign key tuples on a same node. In one embodiment, the cDBMS processes fact table 134 so as to maximize the number of the same valued fact table tuples on each node. Thus, a node that contains multiple fact table tuples with the same foreign key value, keeps those tuples locally stored, while other fact table tuples are redistributed by transferring the tuples to other nodes in the cDBMS. Accordingly, on node 110 the fact table tuples with values 1 and 3 from foreign key values 130 are kept locally stored on node 110, while the fact table tuple corresponding to the value of 2 is sent to node 112.

Since the fact table tuple corresponding to the value of 2 is sent to node 110, the cDBMS transfers the dimension table tuple corresponding to the value of 2 from primary key values 120 to node 112 as well. FIG. 1 depicts further redistribution of tuples between node 110 and node 112, to accumulate the same value primary key and foreign key tuples on the same node for the distributed join operation.

In another embodiment, the cDBMS processes a fact table by keeping dimension table tuples local. In such an embodiment (not depicted in FIG. 1), the tuples from fact table 134 that correspond to the values of 1 and 2 are sent to node 110 for join processing, and the tuples from fact table 134 that correspond to the values of 3 and 4 are sent to node 112 for join processing.

In an embodiment, while processing the tuples, values in the join keys may be transformed using a hashing algorithm. A hashing algorithm is a technique that maps any length input data, such as a value in a join key of a table, to a fixed length data. The longer the fixed length is, the more accurately the hash algorithm ensures that different input values produces different transformed values. Accordingly, if transformation is used (such as in hash based join operation embodiments) the join key values may be a hash algorithm transformations of respective values in join keys.

Regardless of the techniques used for reading, transforming and distributing join key value tuples on the nodes of the cDBMS, a substantially same amount of same join key value tuples end up on node 110 and node 112. Thus, join operator 140 on node 110 performs the same amount of matching of tuples from dimension table 124 with fact table 134 as does join operator 142 on node 112. Furthermore, the network utilization of each node is balanced as substantially equal number of tuples are transferred to each node for matching, thus, equalizing the number of tuples to be processed by the network interface of each node. Accordingly, the performance of the local join processing on node 110 is not significantly different from the performance of the local join processing on node 112. Therefore, given non-heavy hitter tuples, the cDBMS does not incur any setback in performance of the distributed join operation. Nodes 110 and 112 have similar load of tuples after the re-distribution and given similar computational power of the nodes, would roughly complete the local join operations of the distributed join operation in the same time.

Run-Time Detection of Heavy Hitters

Figure 2:
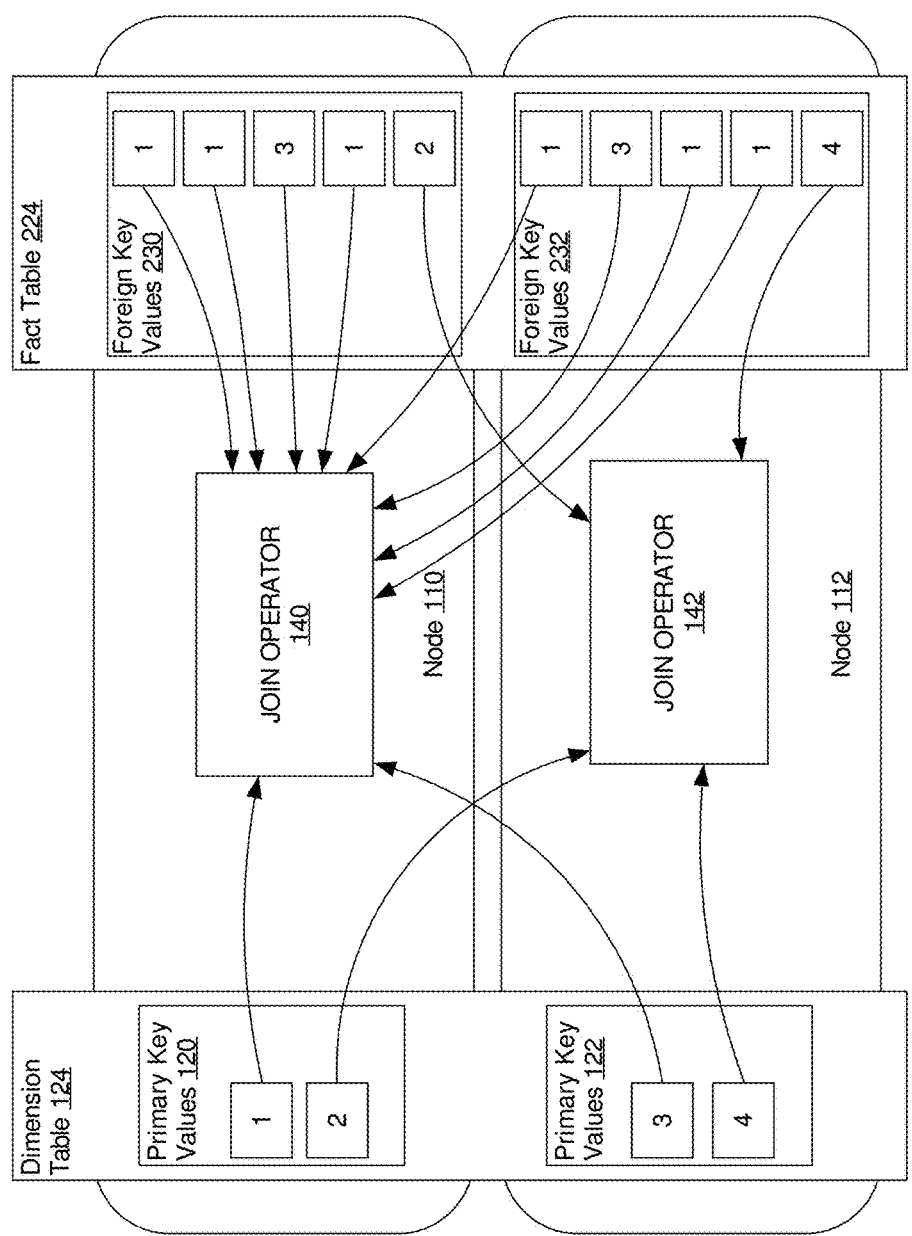
FIG. 2 is a block diagram depicting such an embodiment by illustrating the transfer of tuples during a distributed join execution in the CDBMS without run-time detection of heavy hitters.

If a fact table contains data skew and has heavy hitter values, a node in a cDMBS may have significantly more tuples to process for join than another node in the cDBMS, in an embodiment. FIG. 2 is a block diagram depicting such an embodiment by illustrating the transfer of tuples during a distributed join execution in the CDBMS without run-time detection of heavy hitters. In FIG. 2, the distributed join operation is performed on dimension table 124 of FIG. 1 and fact table 224. Join operators 140/142 perform the distributed join operation on nodes 110/112 of the cDBMS. Unlike fact table 134 of FIG. 1, fact table 224 contains heavy hitter tuples, such as those with the foreign key value of 1. Using the techniques described in FIG. 1, join operator 140 is assigned to tuples with the heavy hitter join key value of 1. As a result, node 110 receives four times more tuples than join operator 142 on node 112. Since, the execution time of the distributed join is determined by the slowest node, the increased load on node 110 may slow down the distributed join.

To re-distribute the load due to heavy hitters, the heavy hitter tuples need to be first detected at run-time of a distribution join operation. To detect heavy hitters, a cDBMS uses a datastore to track the heavy hitters during the distributed join execution on nodes, in an embodiment. The cDBMS stores the heavy hitters into the datastore, as tuples are processed for the distributed join operation. Additionally or alternatively the datastore may include a node datastore for each node in the cDBMS that receives tuples for processing of the distributed join. The cDBMS computes the frequency of each join key value observed based on the entries in the datastore.

When a certain amount of join key values have been counted, the cDBMS identifies the heavy hitters based on the counts of each join key value in the datastore. For example, the cDBMS may sum up all the counts for the same valued join key values in each of the node datastores to determine the heavy hitter join key values for the cDBMS. In an embodiment, heavy hitter join key values are identified during partitioning of tables for a distributed join operation in a cDBMS. As the cDBMS reads a stream of tuples from a table to place on a particular node for the join operation, the cDBMS may analyze the tuple's join key value and increment the appropriate count in the datastore. In another embodiment, the heavy hitter join key values may be determined during an operation on the table that precedes the distributed join operation. For example, a scan operation that reads a stream of tuples from a table, may precede the distributed join operation on the table. In such a case, the cDBMS updates the datastore based on analyzing the stream for heavy hitters during the previous scan operation. In yet another embodiment, if, due to previous operations, the table has already been distributed among nodes of the cDBMS without the determination of heavy hitter join key values, then the cDBMS requests each node to analyze for heavy hitters the tuples of the table partition on the node. In such an embodiment, streams of tuples are read from each partition of the table, and the datastore for the table is updated according to the analysis for heavy hitter join key values.

Figure 3:
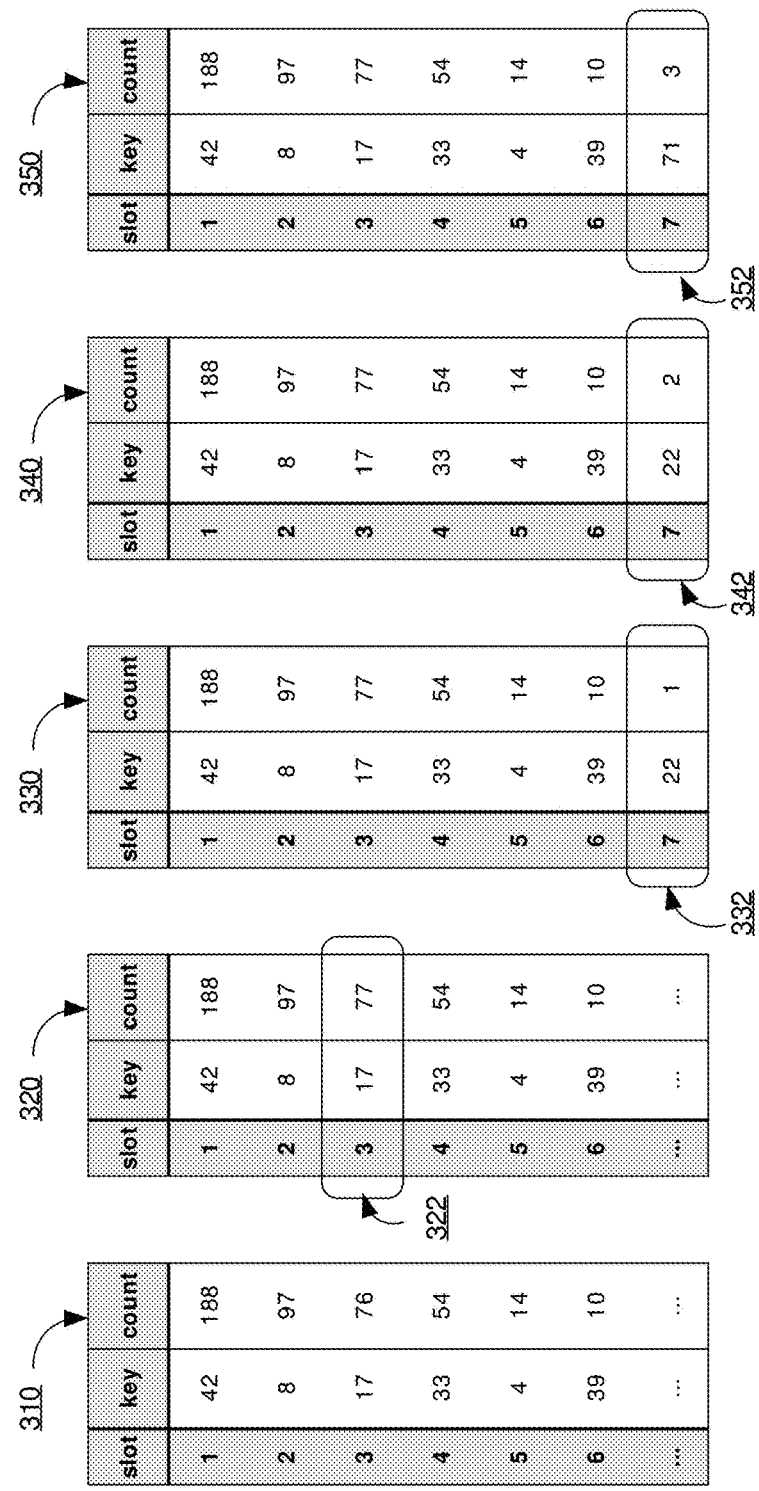
FIG. 3 is a block diagram that depicts a datastore for run-time tracking unique join key values in a joined table, in an embodiment.

FIG. 3 is a block diagram that depicts a datastore for run-time tracking of unique join key values in a joined table, in an embodiment. The datastore in block 310 includes a count for each of the unique key values that the datastore tracks. When another copy of a join key is read from the joined table, the count corresponding to the join key value is incremented. For example, if the cDBMS reads another join key with the value of 17 (as illustrated by the difference between block 310 and block 320), then the join key count for the value of 17 is incremented as depicted in block 322 of block 320.

Yet, if a new join key value is received, then the new join key value is inserted into the datastore and an initial count is assigned to the new join key. For example, the cDBMS reads the new join key value of 22 and causes the datastore to be updated as depicted in block 332 of block 330. When another join key value of 22 is read, the corresponding count for the join key value is updated as depicted in block 342 of block 340.

In an embodiment, the local datastore for heavy hitters of the joined table is of a fixed size. If the fixed size is lesser than the number of unique join key values (cardinality of join keys), then the local datastore may not track counts for all unique join key values. In one embodiment, if a fixed size datastore is full, a new unique join key value is not inserted into the fixed size datastore for tracking unique join key values. Thus, the heavy hitter join key values are determined based on a subset of unique join key value counts.

In another embodiment, if the fixed size datastore is full, the new unique join key value replaces the existing unique join key values that have the least count in the datastore. The new unique join key value is then assigned to an initial count in the datastore.

In an embodiment, the initial count assigned to the new join key is greater than or equal to the count of the replaced join key in the datastore. By assigning the new join key value at least the same count as the lowest count join key in the datastore, it is guaranteed that the new join key value has the maximum count possible since the start of the counting the join key values. There is a possibility that the new join key value may have been read before but discarded from the datastore at a later point when a newer join key value was received. However, the new join key value wouldn't have been discarded when the newer value was received, if the new join key value had a count at least greater than the current lowest count join key value in the datastore at that time. Therefore, the new join key value may have been read at most as many times as the current lowest count.

For example, in FIG. 3, the datastore in block 340 depicts a fixed size datastore that can store up to seven unique join key values and their respective counts. The datastore is full and no new unique join key value can be inserted without replacing an existing join key value. When a join key value is read that does not exist in the datastore such as the value of 71, the cDBMS replaces the lowest count unique join key value of 22, with the new join unique key value. Since the lowest join key value of 22 has the count of 2, the CDBMS selects initial count for the new join key value as 3 as depicted in block 352 in datastore 350. Thus, the initial count for the new join key value is greater than or equal to the count of the replaced join key value. In a related embodiment, the initial count for the new unique join key value is determined by incrementing the lowest count join key unique value. For example, the count for the value of 22, 2, in block 342 is incremented by 1 to yield the count of 3 in block 352 for the value of 71.

Storing Heavy Hitters

In an embodiment, elements of the datastore, such as unique key values and counts, are accessed based on a unique key value to update the corresponding count. Additionally or alternatively, elements of the datastore are accessed based on respective counts in the datastore in order to remove the unique key value corresponding to the lowest count and replace the unique key value with a new unique key value.

To enable these different types of accesses to a datastore, a hash table data structure is used for the datastore, in an embodiment. The hash table data structure uses a hash function to compute an index based on each unique key value. The indices are associated with the respective table elements that store the corresponding unique key values and counts. Since the hash table uses an index, a particular unique key value and its respective count may be accessed and updated efficiently.

In a related embodiment, the hash table data structure is used with a heap data structure for the datastore. The heap provides a tree based data structure of heap nodes, where each parent and child node has the same particular relationship. Each heap node is associated with a unique join key value and the corresponding count that are continued to be stored in the hash table. The particular heap node relationship is based on the relationship of counts of the unique join key values. In one embodiment, the relationship of the heap nodes is based on a parent heap node having a lesser or equal count than the child(ren) heap nodes of the parent heap node. For example, the root heap node may be assigned to the hash table elements that contain the lowest count of the counts in the datastore. Using the heap node relationship in the heap data structure, the cDBMS may efficiently access the lowest count heap node to replace the corresponding join key value with a new join key value and assign the new join key value an initial count. Using the hash table, the cDBMS may also efficiently access the count for a particular join key value to update the count.

In yet another related embodiment, the hash table data structure is used with a sorted array for the datastore. An element in the sorted array corresponds to a count of a unique join key value in the hash table, and the elements of the sorted array are sorted based on the corresponding counts. Accordingly, the cDBMS may efficiently access the (last or first) element of the sorted array corresponding to the lowest count and may replace the corresponding join key value with a new join key value and initial count. Each element is also associated to the hash table's unique join key value for which the element of the array stores the count. Thus, the cDBMS may also efficiently access the count for a particular join key value to update the count using the hash table. If an existing count is updated or a count is replaced, the array is re-sorted.

Broadcasting Heavy Hitters

In an embodiment, the cDBMS determines that a join key value is a heavy hitter if the join key value is found in the datastore and has a count above a threshold count. The threshold count may be determined based on the size of a table for which join keys are being processed and/or based on the number of nodes in the cDBMS that are performing the distributed join operation. Additionally or alternatively, the threshold count may also be selected by an administrator of the cDBMS. In another embodiment, the threshold count is dynamic and is determined by the current count of join key values in the datastore. For example, the threshold count may be set to the n-th highest count, where n is less than or equal to the length of the datastore. In another example the dynamic threshold may be set to a statistical function of the counts in the datastore, such as the $25^{th}$ percentile of counts in the datastore.

The join-key values in the datastore that have counts that are above the threshold count are denoted as heavy hitters. The cDBMS identifies and broadcasts all the dimension table tuples with heavy hitter join key value values across the nodes of the cDBMS that are performing the distributed join operation on the dimension table. As the cDBMS reads tuples from the corresponding fact table, the cDBMS also identifies the fact table tuples that contain the heavy hitter join key values. Unlike the dimension table heavy hitter tuples, the fact table heavy hitter tuples are kept locally on a node to which the tuples were initially distributed to, and thus, the fact table heavy hitter tuples are not transferred to other nodes of the cDBMS.

For example, if a fact table tuple is identified to contain a heavy hitter join key value, while another cDBMS node contains the corresponding dimension table tuple, the fact table tuple is not transferred to the other node but is rather kept local on the originally distributed node. The local join operation may still be successfully performed on the original node because the corresponding dimension table tuple on the other node is transferred to the particular node as part of the broadcasting. Accordingly, each heavy hitter tuple from the fact table that is kept local on a node, would still be matched to the dimension table tuple in a local join operation due to the broadcasting.

Figure 4:
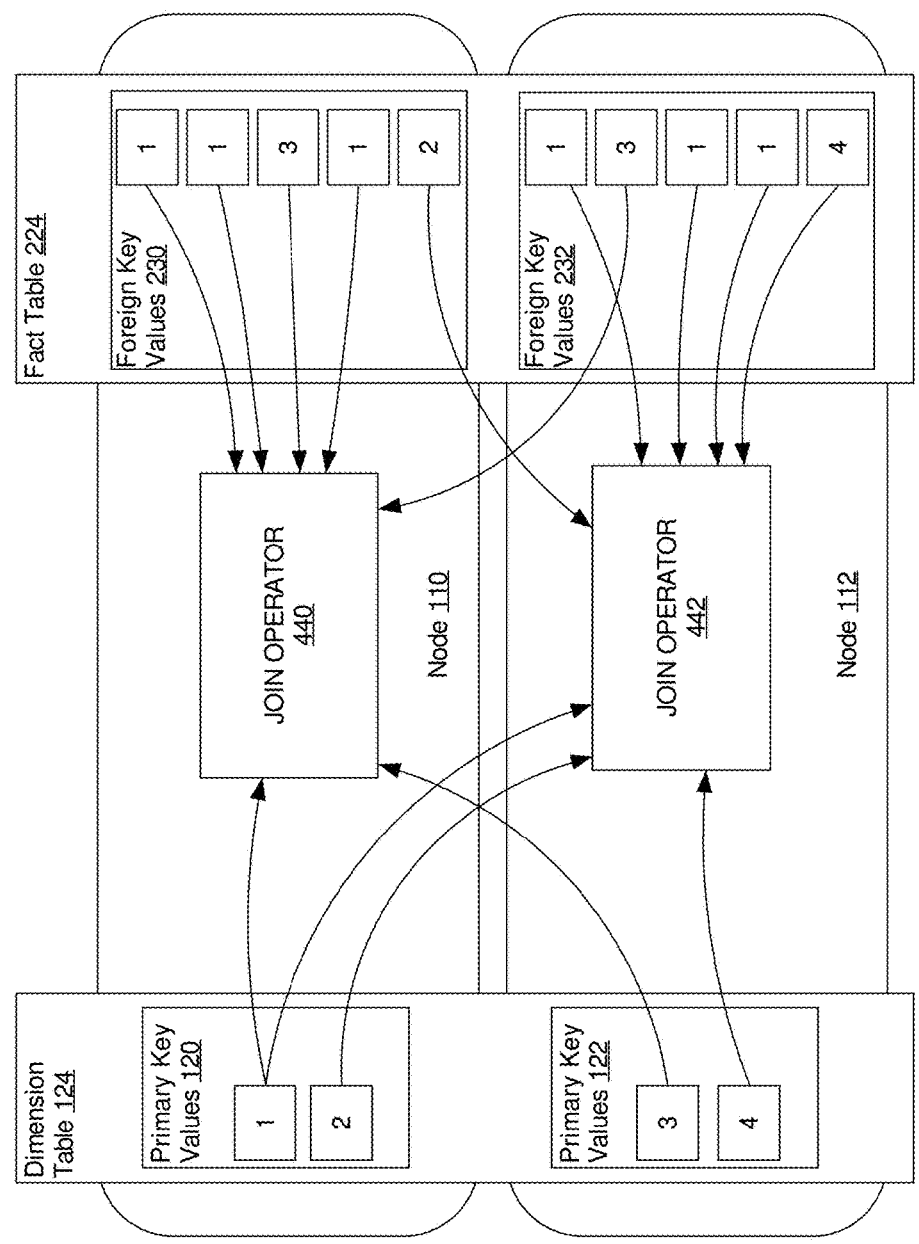
FIG. 4 is a block diagram that depicts broadcasting of heavy hitter tuples, in an embodiment.

FIG. 4 is a block diagram that depicts broadcasting of heavy hitter tuples, in an embodiment. Using the techniques described above, the cDBMS identifies the join key value of 1 as a heavy hitter in fact table 224. Both nodes 110/112 contain the heavy hitter join key values in the respective foreign key values 230/232. However, the heavy hitter join key values are not collected onto any particular node as illustrated in FIG. 2. Unlike FIG. 2, all heavy hitter join key values are kept locally on the nodes to which the heavy hitter join key values were originally distributed, as shown by the arrow to join operators 410/442.

On the other hand, the dimension table tuples that include heavy hitter join key values are broadcasted across the nodes of the cDBMS. Primary key values 120 on node 110 contain the heavy hitter join key value of 1, which was identified by detecting heavy hitters in fact table 224's foreign key values. The cDBMS broadcasts the primary key 1 tuple at least to those nodes of the cDBMS that contain the corresponding heavy hitter foreign key values, as shown by arrows to join operators 440 and 442 on nodes 110 and 112, respectively.

By broadcasting the heavy hitter primary key tuples and keeping the heavy hitter foreign key tuples local, the cDBMS distributes the load of join processing of the heavy hitter join key tuples among the nodes. Since the fact table tuples of fact table 224, including the heavy hitter foreign key value of 1, have been originally distributed across the nodes of the cDBMS, the fact table heavy hitter tuples are already substantially dispersed across the nodes of the cDBMS due to this original distribution. The broadcasting of the primary key value of 1 tuples of dimension table 124 causes the corresponding primary key value tuples to be available on each node where the foreign key value of 1 tuple is already available. Thus, the join operation on each node can successfully match the tuples for the value of 1 from the dimension table 124 and fact table 224 without the distributed join operation being overloaded on any of the nodes of the cDBMS.

Run-Time Re-Evaluation of Heavy Hitters

In an embodiment, the cDBMS may revert the transfer of a non-heavy hitter join key tuple if the join key value of the tuple is later identified as a heavy hitter. Particularly, the cDBMS may revert the transfer if the originally transferred node is experiencing performance degradation in local processing or significant load imbalance compared to the other nodes in the cDBMS.

Before heavy hitter join key values are identified for a distributed join operation, as the distributed join operation is executed on a fact table and a dimension table, some of the non-heavy hitter tuples are transferred to the nodes where the corresponding dimension table tuples with the respective join key value reside. The cDBMS records such transfers, particularly information about the originating node for the each transferred fact table tuple. If later, certain fact table tuples are identified as heavy hitter join key values, the cDBMS may transfer back those fact table tuples to the corresponding originating nodes from which the fact table tuples were recorded to have transferred. The dimension table tuples corresponding to the newly detected heavy hitter join key values are broadcasted to the nodes of the cDBMS. Accordingly, on each node of the distributed join operation, the local join operation has available the respective dimension table tuples of the newly identified heavy hitter join key values to match with the transferred back fact table tuples.

In some embodiments, the cDBMS may evaluate heavy hitters more than once at different points during the runtime of the distributed join. The term "re-evaluation of heavy hitters" (or "re-evaluate heavy hitters") refers herein to an additional evaluation of the datastore for detecting new heavy hitters and performing the techniques described herein for evenly distributing the newly detected heavy hitters across the nodes of the cDBMS. In one embodiment, the heavy hitters are re-evaluated when a particular percentage of joined table tuples have been processed by the cDBMS. For example, when half of the fact table tuples have been read, the cDBMS accesses the datastore to determine new heavy hitter join key values. In other embodiments, the heavy hitters are re-evaluated when counts in the datastore reach a threshold. For example, when the lowest count in the datastore reaches a particular number, the cDBMS accesses the datastore to determine new heavy hitter join key values. In some embodiments in which a dynamic threshold count is used to identify heavy hitters, the cDBMS may re-evaluate heavy hitters when one or more join key counts exceed the dynamic threshold. The cDBMS may also re-evaluate heavy hitters when one or more heavy hitter join key value counts fall below the dynamic threshold and thus, are not heavy hitters any more.

During a re-evaluation of heavy hitters, if a heavy hitter join key value count no longer exceeds the dynamic threshold count, then the cDBMS may revert the broadcast of the dimension table tuples that contain the former heavy hitter join key value. To do so, the cDBMS also tracks the original node to which the dimension table tuple with the former heavy hitter join key value has been partitioned. When the former join key value is no longer a heavy hitter, the corresponding former dimension table tuple is removed from all the nodes of the cDBMS to which the former dimension table tuple was broadcasted. The cDBMS then transfers the fact table tuples that contain the join key value of the former tuple to the original node for join operation processing on the original node.

Distribution Join of Fact Table with Another Fact Table

Techniques described herein may be applied to a distributed join operation of a fact table with another fact table. In an embodiment, the cDBMS performs a distributed join operation to join two fact tables on a join key. The cDBMS maintains two datastores for each of the fact tables. As the first fact table is partitioned, the tuples of the first fact table are processed to detect the heavy hitter join key values in the first fact table using the first datastore. If a tuple from the first table is determined to contain a heavy hitter join key value, then the tuple is kept local on the node to which the tuple was partitioned. Otherwise the tuple maybe transferred to a target node as part of the distributed join processing.

The techniques for processing of the second fact table are similar to the techniques for processing of a fact table during a distributed join operation with a dimension table, as described in the previous sections. According to those techniques, the heavy hitter second table tuples are kept local on the originally distributed nodes, while the corresponding first table tuples are broadcasted across the nodes of the cDBMS.

Additionally or alternatively, if a second fact table tuple contains a join key value that is not a heavy hitter for the second table but is a heavy hitter for a first table, then the second table non-heavy hitter tuple is broadcasted across the nodes of the cDBMS. Thus, if a join key value is only a heavy hitter value for either the first fact table or the second fact table, then the heavy hitter tuple for the join key value is kept local, while the non-heavy hitter tuple for the same join key value is broadcasted across the nodes of the cDBMS.

In an embodiment, if a join key value is a heavy hitter for the first fact table as well as the second fact table, then a symmetric fragment replication is used. The term "symmetric fragment replication" is referred herein to the cDMBS logically organizing the nodes in a rectangle such that each node is assigned a row and a column number. To ensure that every tuple for a specific heavy hitter join key value from one fact table is joined exactly once with every heavy hitter tuple of the other fact table that has the same heavy hitter join key value, each node replicates its first fact table heavy hitter tuples across the nodes that share the node's row number. The node also replicates its second fact table heavy hitter tuples across the nodes that share the node's column number. By replicating heavy hitter tuples to only a subset of the nodes in the cDBMS for both fact tables, full replication of the heavy hitter tuples for either of the fact tables is avoided. Thus, both the first fact table heavy hitter tuple and the second fact table heavy hitter tuple with the same join key value are re-distributed among the nodes of the cluster based on the space and computing resource availability.

Database Management Systems

A database management system (DBMS), such as cDBMS, manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of nodes that may store one or more tables. The DBMS may manage tables stored on the cluster of nodes similar to managing tables stored on persistent storage.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issues a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system, such as a cDBMS, is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
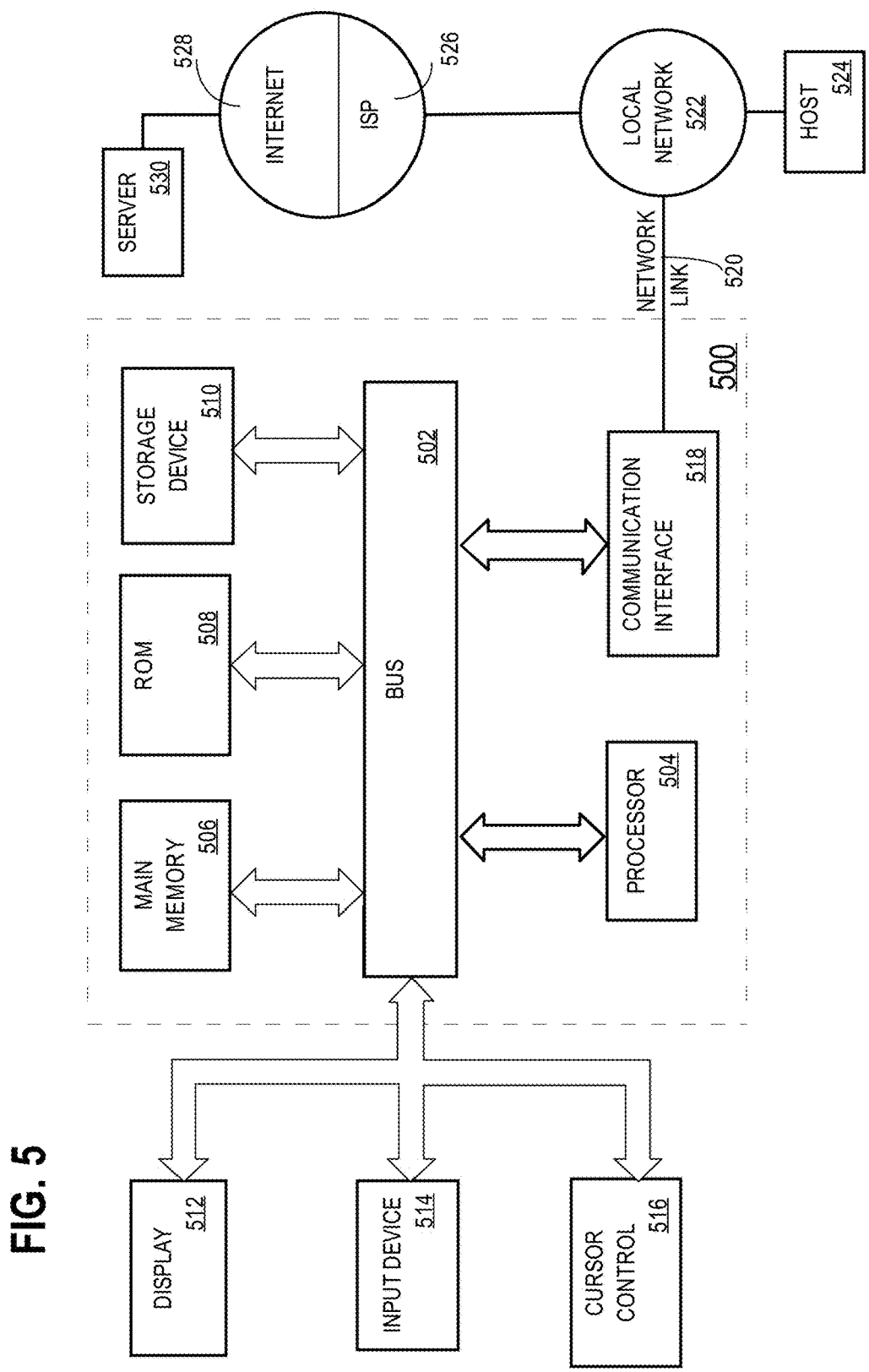
FIG. 5 is a block diagram that illustrates a computer system upon which an embodiment of the approach may be implemented.

For example, FIG. 5 is a block diagram that illustrates a computer system 500 upon which an embodiment of the approach may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Cloud Computing Overview

The techniques described herein are implemented using one or more processing solutions, examples of which include distributed systems, clustered computing systems, and cloud computing systems. In an embodiment, a DBMS and/or a cluster of nodes may be part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to the DBMS and the cluster of nodes, or to other entities within this description, is controllable via an interface that is exposed at a cloud computing system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for executing a join operation by determining a distribution of tuples, for the join operation, from a database among a cluster of nodes and that are coupled to a database management system (DBMS), the DBMS managing the database, comprising:

executing a particular join operation to join a first table with a second table based on a first join key of the first table and a second join key of the second table, the executing further comprising:

said DBMS distributing first plurality of tuples of the first table across nodes of the cluster;

said DBMS distributing second plurality of tuples of the second table across nodes of the cluster;

said cluster of nodes generating a respective count for each second join key value of a subset of second join key values in said second join key at a receipt of said second plurality of tuples of the second table;

based on the respective count for said each second join key value of said subset, establishing a particular second join key value as a heavy hitter;

in response to determining that the particular second join key value is a heavy hitter, replicating a first tuple across a set of nodes of the cluster, wherein the first tuple contains a first join key value, from the first join key, that corresponds to said particular second join key value; and each node of said set of nodes locally performing a join operation between plurality of tuples of said first table and said second table based on said first join key value and values of said second join key.

2. The method of claim 1, wherein generating a respective count of each second join key value of the subset of second join key values further comprises:

incrementing the respective count of said each second join key value at a receipt by a node of said cluster of a tuple, from the second plurality of tuples, that includes said each second join key value in the second join key of the second table;

updating in a datastore said respective count with the incremented respective count of said each second join key value.

3. The method of claim 2, wherein the datastore comprises a hash table and a sorted array, and wherein each second join key value of the subset is stored in the hash table as a key of the hash table, and a respective count, of said each second join key value, is stored in an element of the sorted array.

4. The method of claim 2, wherein:

the datastore comprises of a hash table and a heap, and wherein each second join key value of the subset is stored in the hash table as a key of the hash table, and a respective count, of said each second join key value, is stored in a heap node of the heap, wherein a parent heap node of said heap node of the heap contains a count that is less than or equal to said respective count of said each second join key value and a child heap node of said heap node of the heap is greater than or equal to said respective count of said each second join key value.

5. The method of claim 1, further comprising in response to determining that the particular second join key value is a heavy hitter, replicating the first tuple across all nodes of the cluster.

6. The method of claim 1, further comprising in response to determining that the particular second join key value is not a heavy hitter, transferring to a node, that contains the first tuple, one or more tuples, of the second plurality of tuples, that include the particular second join key value in the second join key of the second table.

7. The method of claim 1, further comprising:

determining that a datastore storing heavy hitters does not include the particular second join key value;

in response to determining that the datastore storing heavy hitters does not include the particular second join key value:

storing the particular second join key value into the datastore;

associating the particular second join key value with an initial count in the datastore.

8. The method of claim 1, further comprising:

determining that a datastore storing heavy hitters does not include the particular second join key value and that the datastore is full;

in response to determining that the datastore storing heavy hitters does not include the particular second join key value and that the datastore is full:

retrieving from the datastore the lowest count in the datastore and a second join key value associated with the lowest count in the datastore;

replacing, in the datastore, the second join key value associated with the lowest count with the particular second join key value;

associating with the particular second join key value in the datastore a count equal at least to the lowest count in the datastore.

9. The method of claim 8, wherein the count associated with the second join key value is assigned to an increment of the lowest count in the datastore.

10. The method of claim 1, further comprising:

generating the first join key value by applying a hashing algorithm to a value from the first join key of the first table; and generating the second join key value by applying the hashing algorithm to a value from the second join key of the second table.

11. The method of claim 1, wherein the first join key is a primary key of the first table.

12. The method of claim 1, wherein said cluster of nodes generating a respective count further comprises storing in a datastore of each node, of said cluster, that receives a tuple with said each second join key value, the respective count of said each second join key value.

13. One or more non-transitory storage media storing instructions which, when executed by one or more computing devices, cause executing a join operation by determining a distribution of tuples, for the join operation, from a database among a cluster of nodes and that are coupled to a database management system (DBMS), the DBMS managing the database, the instructions further include instructions which, when executed by the one or more computing devices, cause:

executing a particular join operation to join a first table with a second table based on a first join key of the first table and a second join key of the second table, wherein the instructions that cause executing the particular join operation further include instructions which, when executed by the one or more computing devices, cause:

said DBMS distributing first plurality of tuples of the first table across nodes of the cluster;

said DBMS distributing second plurality of tuples of the second table across nodes of the cluster;

said cluster of nodes generating a respective count for each second join key value of a subset of second join key values in said second join key at a receipt of said second plurality of tuples of the second table;
based on the respective count for said each second join key value of said subset, establishing a particular second join key value as a heavy hitter;
in response to determining that the particular second join key value is a heavy hitter,
replicating a first tuple across a set of nodes of the cluster, wherein the first tuple contains a first join key value, from the first join key, that corresponds to said particular second join key value; and
each node of said set of nodes locally performing a join operation between plurality of tuples of said first table and said second table based on said first join key value and values of said second join key.

14. The one or more non-transitory storage media of claim 13, wherein the instructions further include instructions which, when executed by the one or more computing devices, cause:
incrementing a respective count of each second join key value, of the subset, at a receipt by a node of said cluster of a tuple, from the second plurality of tuples, that includes said each second join key value in the second join key of the second table;
updating in a datastore said respective count with the incremented respective count of said each second join key value.

15. The one or more non-transitory storage media of claim 14, wherein the datastore comprises a hash table and a sorted array, and wherein each second join key value of the subset is stored in the hash table as a key of the hash table, and a respective count, of said each second join key value, is stored in an element of the sorted array.

16. The one or more non-transitory storage media of claim 14, wherein:
the datastore comprises of a hash table and a heap, and wherein each second join key value of the subset is stored in the hash table as a key of the hash table, and
a respective count, of said each second join key value, is stored in a heap node of the heap, wherein a parent heap node of said heap node of the heap contains a count that is less than or equal to said respective count of said each second join key value and a child heap node of said heap node of the heap is greater than or equal to said respective count of said each second join key value.

17. The one or more non-transitory storage media of claim 13, wherein the instructions further include instructions which, when executed by the one or more computing devices, cause, in response to determining that the particular second join key value is a heavy hitter, replicating the first tuple across all nodes of the cluster.

18. The one or more non-transitory storage media of claim 13, wherein the instructions further include instructions for causing, in response to determining that the particular second join key value is not a heavy hitter, transferring to a node, that contains the first tuple, one or more tuples, of the second plurality of tuples, that include the particular second join key value in the second join key of the second table.

19. The one or more non-transitory storage media of claim 13, wherein the instructions further include instructions which, when executed by the one or more computing devices, cause:
determining that a datastore storing heavy hitters does not include the particular second join key value;
in response to determining that the datastore storing heavy hitters does not include the particular second join key value:
storing the particular second join key value into the datastore;
associating the particular second join key value with an initial count in the datastore.

20. The one or more non-transitory storage media of claim 13, wherein the instructions further include instructions which, when executed by the one or more computing devices, cause:
determining that a datastore storing heavy hitters does not include the particular second join key value and that the datastore is full;
in response to determining that the datastore storing heavy hitters does not include the particular second join key value and that the datastore is full:
retrieving from the datastore the lowest count in the datastore and a second join key value associated with the lowest count in the datastore;
replacing, in the datastore, the second join key value associated with the lowest count with the particular second join key value;
associating with the particular second join key value in the datastore a count equal at least to the lowest count in the datastore.

21. The one or more non-transitory storage media of claim 20, wherein the count associated with the second join key value is assigned to an increment of the lowest count in the datastore.

22. The one or more non-transitory storage media of claim 13, wherein the instructions further include instructions which, when executed by the one or more computing devices, cause:
generating the first join key value by applying a hashing algorithm to a value from the first join key of the first table; and
generating the second join key value by applying the hashing algorithm to a value from the second join key of the second table.

23. The one or more non-transitory storage media of claim 13, wherein the first join key is a primary key of the first table.

24. The one or more non-transitory storage media of claim 13, wherein the instructions further include instructions which, when executed by the one or more computing devices, cause storing in a datastore of each node, of said cluster, that receives a tuple with said each second join key value, the respective count of said each second join key value.

* * * * *